Jan. 19, 1960  F. GUTMANN  2,921,659
ELECTROMAGNETIC CLUTCH LAMINATION TREATMENT
Filed April 30, 1957
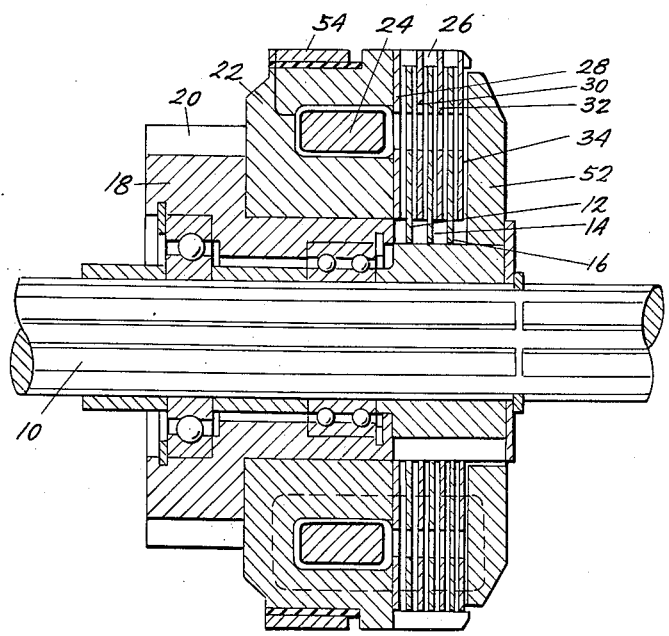
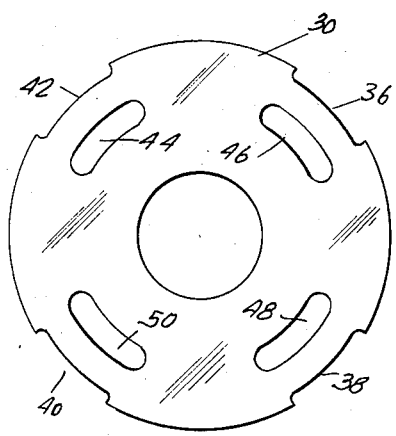
INVENTOR.
FRITZ GUTMANN
BY Ostrolenk, Faber,
Gerb & Soffen
ATTORNEYS

United States Patent Office 2,921,659
Patented Jan. 19, 1960

2,921,659
ELECTROMAGNETIC CLUTCH LAMINATION TREATMENT

Fritz Gutmann, Feldkirch-Gissingen, Austria, assignor to I-T-E Circuit Breaker Company, Philadelphia, Pa., a corporation of Pennsylvania Application April 30, 1957, Serial No. 656,103

2 Claims. (Cl. 192—107)

My invention relates to an electromagnetic clutch lamination wherein the surface thereof is pretreated to achieve a stabilized coefficient of friction which is equivalent to the coefficient of friction achieved by an untreated lamination after an extended period of operation.

Electromagnetic clutch laminations of the type to which my invention is directed are fully set forth in Patent No. 2,254,625 to Ryba, Patent No. 2,052,846 to Ryba.

As seen in the above noted references, electromagnetic clutches utilizing steel laminations or discs are so constructed as to have a first disc operatively connected to a driven member and a second disc operatively connected to a driving member. The driven member disc and driving member disc are driven into frictional engagement with one another by means of a magnetic flux whereupon the driving and driven members are operatively connected to one another.

In the past, it has been found that the coefficient of friction of the lamination surfaces changes over an extended period of operation until the coefficient of friction stabilizes at a point which may vary as much as 50 percent below the original value with a corresponding decrease in the rate of source of the clutch.

It is desirable to initially operate the clutch at this stabilized value of friction coefficient, but to do this would require a relatively long wearing-in period which would require thousands of full load clutching operations. It is apparent that this would be an unsatisfactory solution to the problem. While some methods are available for treating the surface of the laminations, such as steam annealing and phosphate treatments, these methods are relatively unsatisfactory and expensive.

The principle of my invention is to surface harden the lamination surfaces by increasing the surface nitrogen content or the carbon and nitrogen content thereof and, if desired, to subsequently harden the disc by producing an oxide layer thereon.

I have found that with the use of my novel invention that the coefficient of friction of the surface laminations is substantially the same as the coefficient of friction of any untreated lamination after extended operation thereof.

Hence, my novel treated laminations may be immediately placed in an operating clutch and the torque characteristics thereof will remain substantially unchanged from the very beginning of its operation.

Accordingly, the primary object of my invention is to provide a novel lamination for an electromagnetic clutch device wherein the coefficient of friction thereof remains substantially constant.

Another object of my invention is to provide a novel electromagnetic clutch lamination wherein the coefficient of friction thereof is stabilized prior to its operation in an electromagnetic clutch device.

Another object of my invention is to increase the surface nitrogen content or the surface carbon and nitrogen content of an electromagnetic clutch lamination whereby the coefficient of friction thereof remains substantially unchanged during operation.

A further object of my invention is to stabilize the coefficient of friction of an electromagnetic clutch lamination by increasing the surface nitrogen content or the carbon and nitrogen content thereof and thereafter hardening the disc by producing an oxide layer thereon to increase the permissible loading of the disc.

A still further object of my invention is to surface harden an electromagnetic clutch lamination by the above-mentioned processes, such hardening being achieved after the surfaces of said clutch lamination have been finish machined.

These and other objects of my invention will become apparent when taken in conjunction with the drawings, in which:

Figure 1 shows a side cross-sectional view of an electromagnetic clutch utilizing magnetic laminations.

Figure 2 shows a front view of one of the laminations utilizing the clutch of Figure 1.

Referring now to Figures 1 and 2, the clutch shown therein is generally comprised of a driving shaft 10 which has laminations 12, 14 and 16 connected thereto.

A driven member 18, which may include the gear teeth 20, has a magnetic body 22 fastened thereto which contains an energizing coil 24. Magnetic body 22 is further provided with a spline 26 which has the laminations 28, 30, 32 and 34 fastened thereto.

A typical lamination, such as lamination 30 is set forth in Figure 2, and it is seen that it comprises indentations 36, 38, 40 and 42 which cooperate with spline 26 so that the lamination rotates with magnetic body 22, and yet is axially movable with respect therewith.

The lamination 30 is further provided with openings 44, 46, 48 and 50 which, as will be seen hereinafter, prevents short circuiting of magnetic flux by the laminations.

An armature member 52 is then carried by driving shaft 10 whereby energization of coil 24 over the slip ring 54 will cause a circulating magnetic flux, as indicated by the dotted line in the lower portion of Figure 2, to circulate from the magnetic body 22 through the alternate laminations, magnetic armature member 52, and back to magnetic body 22.

This magnetic flux will cause armature member 52 to be driven to the left whereby the lamination surfaces of laminations 12, 14, 16, 28, 30, 32 and 34 are compacted together so as to operatively connect shaft 10 to driven member 18 through the surface friction of the interengaging laminations.

Clearly, apertures such as the apertures 44, 46, 48 and 50 of disc 30 will force the magnetic flux to pass directly through the laminations and to the armature 52, since they present a relatively high reluctance to radial flux flow through any of the laminations.

As was set forth above, when the lamination surfaces are untreated their coefficient of friction will decrease substantially (in some cases to 50 percent of their initial value), after an extensive period of operation whereby the clutch torque characteristics are radically altered.

The essence of my novel invention is to treat the surface of the laminations so that a stabilized coefficient of friction is achieved in the absence of any break-in period which would require extensive operation of the lamination in a magnetic clutch.

More specifically, my invention comprises the control of the coefficient of friction of an electromagnetic clutch lamination by heat treating the same by a nitriding process, and more specifically by a cyaniding or carbonitriding process, thus increasing the surface carbon and nitrogen content of the clutch laminations.

The cyaniding process would be conventionally performed in a bath of a molten alkali cyanide which may consist either of pure salt or of dilutions down to about 15 percent NaCn. Typically a salt mixture of sodium cyanide, sodium chloride and sodium carbonate may be used. Generally, sodium chloride and sodium carbonate may be used. Generally, the length and temperature of the cyaniding treatment would depend upon the particular type of steel and the degree of surface hardening which is considered to produce optimum results. Thus the temperature of the cyanide bath could vary between 1300° F. and 1600° F. and the immersion time would be from about 15 minutes to 3 hours.

In the carbonitriding process, also known as "gas cyaniding," the steel is hardened in a gas carburizing atmosphere which contains ammonia in control percentages. Generally, this process is practicable up to 1600° F. and the depth to which the carbon and nitrogen penetrate the metal varies with temperature and time. This process will generally use an atmosphere between 0.1 and 5 percent ammonia and temperatures between 1300° F. and 1400° F.

Subsequent hardening of the friction discs may be obtained by immersing them in a salt bath which will produce an oxide layer on the laminations, thereby increasing the permissible lamination loading without encountering additional manufacturing expenses.

The salt baths herein referred to could comprise a mixture of sodium and potassium nitrates containing between 40 to 50 percent $NaNO_3$ and 50 to 60 percent $KNO_3$.

The salt treatment would generally be carried out between about 500° F. and 1200° F. It is essential, however, that the nitrate salt bath should not come in contact with the cyanide bath since the mixture is explosive.

Although I have described preferred embodiments of my novel invention, many variations and modifications will now be obvious to those skilled in the art, and I prefer therefore to be limited not by the specific disclosure herein but only by the appended claims.

I claim:
1. A steel disc lamination for an electromagnetic clutch; at least one surface of said steel disc being engagable with a surface of an adjacent steel disc to frictionally connect said steel disc and said adjacent steel disc; the engaging surface of said steel disc having an increased carbon and nitrogen content to prestabilize the coefficient of friction of said surface; said engaging surface further having an oxide layer thereon to increase the permissible torque loading between said steel disc and said adjacent steel disc.

2. A steel disc lamination for an electromagnetic clutch; said steel disc being comprised of a relatively thin disc having smooth surfaces and a relatively uniform thickness; each of said surfaces of said steel disc being engageable with a surface of a respective adjacent steel disc to frictionally connect said steel disc and the adjacent steel discs; said surfaces of said steel discs having their carbon and nitrogen content increased to case harden said surfaces to prestabilize the coefficent of friction of said surfaces.

References Cited in the file of this patent

UNITED STATES PATENTS

| | | |
|---|---|---|
| 1,493,237 | Birkigt | May 6, 1924 |
| 1,622,261 | Payne | Mar. 22, 1927 |
| 2,095,805 | Frank | Oct. 12, 1937 |
| 2,344,111 | Ryba | Mar. 14, 1944 |

FOREIGN PATENTS

| | | |
|---|---|---|
| 1,058,006 | France | Nov. 4, 1953 |

OTHER REFERENCES

"Mechanical Engineer's Handbook," by L. S. Marks, Fourth edition, pub. by McGraw-Hill Book Co., New York, 1941, page 569. (Copy available in Division 24.)